United States Patent
Arvidsson

(10) Patent No.: US 9,205,726 B2
(45) Date of Patent: Dec. 8, 2015

(54) DOOR BEAM FOR VEHICLES

(71) Applicant: Gestamp Hardtech AB, Lulea (SE)

(72) Inventor: Stefan Arvidsson, Pitea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 14/443,417

(22) PCT Filed: Nov. 15, 2013

(86) PCT No.: PCT/SE2013/000172
§ 371 (c)(1),
(2) Date: May 18, 2015

(87) PCT Pub. No.: WO2014/084768
PCT Pub. Date: Jun. 5, 2014

(65) Prior Publication Data
US 2015/0291011 A1    Oct. 15, 2015

(30) Foreign Application Priority Data

Nov. 29, 2012 (SE) ........................................ 1200732

(51) Int. Cl.
*B60J 5/04* (2006.01)
(52) U.S. Cl.
CPC .............. *B60J 5/0444* (2013.01); *B60J 5/0461* (2013.01)
(58) Field of Classification Search
CPC ............ B60J 5/04; B60J 5/042; B60J 5/0422; B60J 5/0438; B60J 5/0443; B60J 5/0444
USPC ..................................................... 296/146.6
See application file for complete search history.

(56) References Cited

U.S. PATENT DOCUMENTS

| | | | | |
|---|---|---|---|---|
| 4,090,734 A * | 5/1978 | Inami | ..................... | B60J 5/0437 296/146.6 |
| 4,948,196 A * | 8/1990 | Baba | ..................... | B60J 5/0447 296/146.6 |
| 5,600,931 A * | 2/1997 | Jonsson | .............. | E01F 15/0407 296/146.6 |
| 5,743,588 A * | 4/1998 | Ufrecht | ................. | B60J 5/0444 296/146.6 |
| 5,877,938 A * | 3/1999 | Hobbs | ..................... | G06F 1/183 312/223.2 |
| 5,922,922 A * | 7/1999 | Harris | .................... | C07C 5/2775 585/323 |
| 6,416,114 B1 * | 7/2002 | Topker | .................. | B60J 5/0443 296/146.6 |
| 6,641,207 B1 * | 11/2003 | Passone | ................ | B60J 5/0444 296/146.6 |
| 6,679,540 B1 * | 1/2004 | Graber | ................... | B60J 5/0447 296/146.6 |
| 7,086,686 B2 * | 8/2006 | Bullmann | .............. | B60J 5/0444 188/377 |
| 7,819,462 B1 * | 10/2010 | Owens | .................. | B29C 70/222 296/146.6 |
| 2002/0195836 A1 * | 12/2002 | Gehringhoff | .......... | B60J 5/0444 296/187.12 |
| 2004/0036316 A1 * | 2/2004 | Bodin | ................... | B60J 5/0437 296/146.6 |

(Continued)

FOREIGN PATENT DOCUMENTS

| | | |
|---|---|---|
| JP | 2011 225190 | 11/2011 |
| WO | WO02/060712 | 8/2002 |

(Continued)

*Primary Examiner* — Gregory Blankenship
(74) *Attorney, Agent, or Firm* — Mark P. Stone

(57) ABSTRACT

A door beam has a double hat profile between its mounting ends (12, 13). The height of the outer sidewalls (14, 15) of the double hat profile decreases from a central part (25) of the beam towards the mounting ends (12, 13). Thus the height ratio between the outer (14, 15) and the inner (18, 19) sidewalls is decreased towards the mounting ends.

3 Claims, 1 Drawing Sheet

(56) References Cited

U.S. PATENT DOCUMENTS

| | | | | |
|---|---|---|---|---|
| 2004/0150249 | A1* | 8/2004 | Gehringhoff | B60J 5/0444 296/146.6 |
| 2007/0145770 | A1* | 6/2007 | Katou | B60J 5/0425 296/146.6 |
| 2009/0322117 | A1* | 12/2009 | Arvidsson | B60R 21/0428 296/146.6 |
| 2012/0285098 | A1* | 11/2012 | Rakei | B60J 5/0444 49/501 |
| 2014/0246879 | A1* | 9/2014 | Ishigame | B60J 5/0443 296/146.6 |
| 2014/0319869 | A1* | 10/2014 | Baskar | B60J 5/0423 296/146.6 |

FOREIGN PATENT DOCUMENTS

| | | |
|---|---|---|
| WO | WO2008/033066 | 3/2008 |
| WO | WO2011/063950 | 6/2011 |

* cited by examiner

DOOR BEAM FOR VEHICLES

SCOPE OF THE INVENTION

The invention relates to a door beam for vehicles with attachment ends to the vehicle and a double hat profile between the attachment ends, comprising two outer side walls with lateral flanges, two inner side walls, two apexes defined between the outer and inner side walls and directed outwards from the vehicle, and an apex defined between the inner side walls and directed inwards towards the vehicle.

PRIOR ART

Door beams with a double hat profile are known, for example from U.S. Pat. No. 8,061,762 B2.

OBJECT OF THE INVENTION

The object of the invention is to give the door beam a favourable deformation progression in the event of a lateral collision and thereby increase its energy take-up in relation to its weight and to the maximum profile height.

BRIEF DESCRIPTION OF THE INVENTION

The object of the invention is achieved when the height of the outer side walls decreases from a central part of the beam towards the attachment ends, so that the ratio in height between the outer and the inner side walls decreases towards the attachment ends. The invention is defined by the claims.

DESCRIPTION OF THE ILLUSTRATED EXAMPLE OF THE INVENTION

Figure 1:
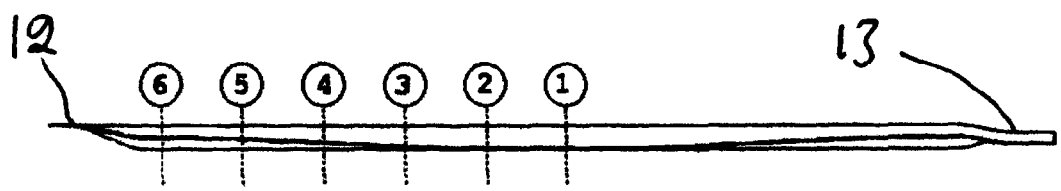
FIG. 1 is a view of a door beam according to the invention.
Figure 2:
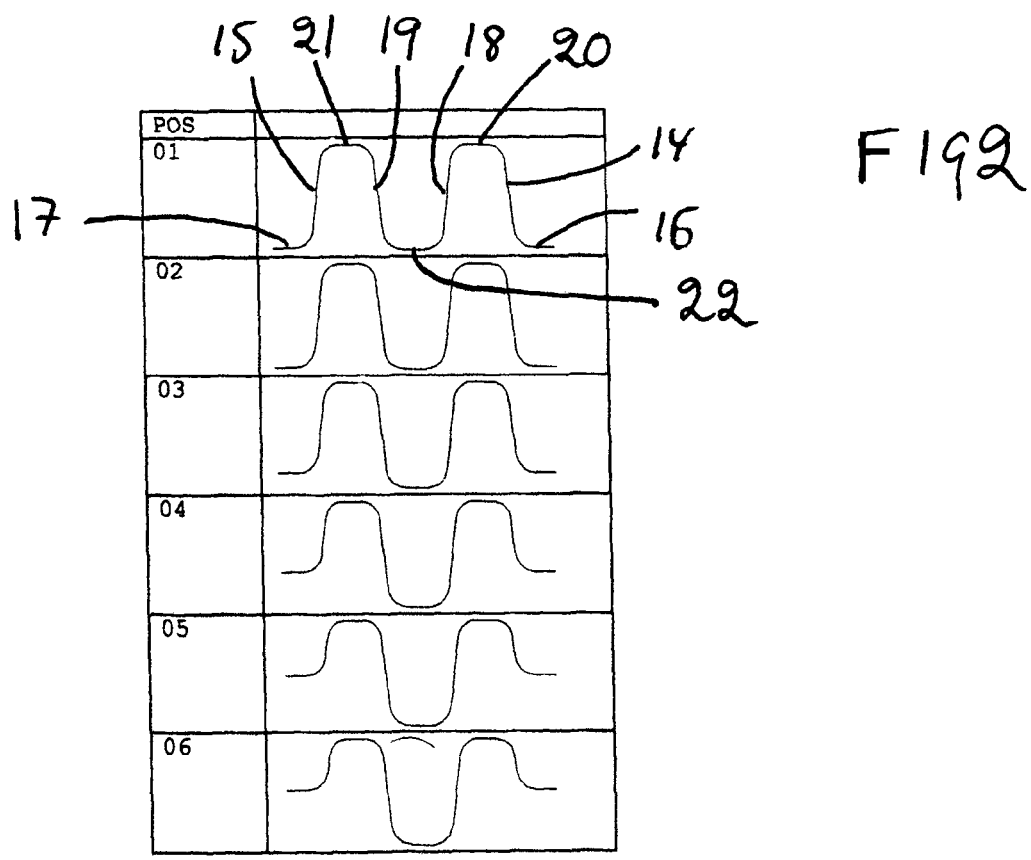
FIG. 2 shows six cross sections of the door beam taken as indicated by the lines 1-6 in FIG. 1.

The door beam shown in the figures consists of thin, high-strength steel plate. It can be formed and hardened using press hardening technology, i.e. thermoformed and hardened in the same operation in cooled forming dies. It has two attachment ends 12, 13 and between the attachment ends it has the double hat profile with two outer side walls 14, 15 with lateral flanges 16, 17 and two inner side walls 18, 19. Between the outer and inner side walls two apexes 20, 21 are formed, directed outwards from the vehicle. Between the inner side walls an apex 22 is formed that is directed inwards towards the vehicle.

On a central part 25 of the beam, the profile is constant, and from this central part the height of the outer side walls 14, 15 decreases at least in one direction over a length of at least ¼ of the length of the beam, or as shown in both directions. In the example it is shown that the height of the side walls decreases symmetrically in both directions in continuous curves, but symmetry is not necessary. The height of the outer side walls 14, 15 decreases towards the attachment ends 12, 13 so that the ratio in height between the outer and inner side walls diminishes towards each attachment end over a length of at least ¼ of the length of the beam. The height of the inner side walls 18, 19 can remain constant as shown. A central part with a constant profile is not necessary.

The attachment ends 12, 13 can have a different appearance. In the example, the attachment end 12 is shown completely flat, while the attachment end 13 has a profile. It can have a low single hat profile or a low double hat profile, for example.

The invention claimed is:

1. Door beam for vehicles with attachment ends (12, 13) to the vehicle and a double hat profile between the attachment ends, comprising two outer side walls (14, 15) with lateral flanges (16, 17), two inner side walls (18, 19), two apexes (20, 21) defined between the outer and inner side walls and directed outwards from the vehicle, and an apex (22) defined between the inner side walls and directed inwards towards the vehicle, wherein the outer side walls (14, 15) have a height that decreases from a central part (25) of the beam towards the attachment ends (12, 13) so that the ratio in height between the outer and the inner side walls decreases towards the attachment ends.

2. Door beam according to claim 1, wherein the height of the outer side walls (14, 15) decreases towards at least one attachment end (12, 13) along at least ¼ of the length of the beam.

3. Door beam according to claim 1, wherein the height of the outer side walls (14, 15) decreases from the central part (25) towards the attachment ends (12, 13) on each side of the central part along at least ¼ of the length of the beam.

* * * * *